US012411097B2

(12) United States Patent
Belassel et al.

(10) Patent No.: US 12,411,097 B2
(45) Date of Patent: Sep. 9, 2025

(54) LAUE MEASUREMENT SYSTEM WITH TURNTABLE AND METHOD OF OPERATING THE SAME

(71) Applicant: PROTO PATENTS LTD., LaSalle (CA)

(72) Inventors: Mohammed Belassel, LaSalle (CA); Kenneth Raymond Geauvreau, LaSalle (CA)

(73) Assignee: PROTO PATENTS LTD., LaSalle (CA)

( * ) Notice: Subject to any disclaimer, the term of this patent is extended or adjusted under 35 U.S.C. 154(b) by 253 days.

(21) Appl. No.: 18/271,358

(22) PCT Filed: Jan. 12, 2022

(86) PCT No.: PCT/CA2022/050041
§ 371 (c)(1),
(2) Date: Jul. 7, 2023

(87) PCT Pub. No.: WO2022/150913
PCT Pub. Date: Jul. 21, 2022

(65) Prior Publication Data
US 2024/0151662 A1    May 9, 2024

Related U.S. Application Data

(60) Provisional application No. 63/136,255, filed on Jan. 12, 2021.

(51) Int. Cl.
*G01N 23/20025* (2018.01)
*G01N 23/203* (2006.01)
*G01N 23/207* (2018.01)

(52) U.S. Cl.
CPC ..... *G01N 23/20025* (2013.01); *G01N 23/203* (2013.01); *G01N 23/207* (2013.01);
(Continued)

(58) Field of Classification Search
CPC ........... G01N 23/20025; G01N 23/203; G01N 23/207; G01N 2223/053;
(Continued)

(56) References Cited

U.S. PATENT DOCUMENTS 3,177,360 A * 4/1965 Hague, Jr. ........ G01N 23/20025
378/81
3,391,276 A * 7/1968 DeLarue ............ G01N 23/2076
378/45
(Continued)

FOREIGN PATENT DOCUMENTS

CN 107238620 A * 10/2017 ....... G01N 23/20025
CN 110542507 A * 12/2019 ............... G01L 1/25
(Continued)

OTHER PUBLICATIONS

International Search Report from corresponding PCT Application No. PCT/CA2022/050041 dated Mar. 16, 2022.
(Continued)

*Primary Examiner* — Thomas R Artman
(74) *Attorney, Agent, or Firm* — Harness Dickey & Pierce P.L.C.

(57) ABSTRACT

An X-ray diffraction apparatus for measuring crystal orientation of crystalline samples is provided. The apparatus comprises a turntable comprising at least one tray; a turntable support platform defining a plane; and a motorized turntable displacement system for remotely displacing the turntable linearly along a first axis parallel to the plane, linearly along a second axis perpendicular to the plane, and rotatably about the second axis; an X-ray assembly provided within the enclosure; and a motorized X-ray assembly displacement system for displacing the X-ray assembly linearly along a third axis, the third axis being parallel to the plane and non-parallel to the first axis; wherein for each one of the crystalline samples, at least one of the motorized (Continued)

turntable displacement system and the motorized X-ray assembly displacement system is actuated to align the collimated X-ray beam with the corresponding measuring position and measure the crystal orientation of the crystalline sample.

20 Claims, 9 Drawing Sheets

(52) U.S. Cl.
 CPC ............ *G01N 2223/053* (2013.01); *G01N 2223/1016* (2013.01); *G01N 2223/306* (2013.01); *G01N 2223/308* (2013.01); *G01N 2223/309* (2013.01); *G01N 2223/63* (2013.01); *G01N 2223/64* (2013.01)

(58) Field of Classification Search
 CPC ..... G01N 2223/1016; G01N 2223/306; G01N 2223/308; G01N 2223/309; G01N 2223/63; G01N 2223/64
 See application file for complete search history.

(56) References Cited

U.S. PATENT DOCUMENTS

| | | | |
|---|---|---|---|
| 5,588,034 A | 12/1996 | Bowen et al. | |
| 6,400,797 B1 * | 6/2002 | D'Amico | G01N 23/20025 378/208 |
| 6,605,473 B1 * | 8/2003 | Hajduk | G01N 23/20 422/534 |
| 7,118,626 B2 * | 10/2006 | Ng | C07K 1/306 117/70 |
| 7,158,609 B2 * | 1/2007 | Kikuchi | G01N 23/205 378/70 |
| 7,409,041 B2 * | 8/2008 | Grassmann | G01N 23/20 378/71 |
| 2005/0045094 A1 * | 3/2005 | Ng | C30B 29/58 117/206 |
| 2005/0078790 A1 | 4/2005 | Kikuchi et al. | |
| 2006/0245544 A1 * | 11/2006 | Grassmann | G01N 23/20 378/79 |
| 2023/0273134 A1 * | 8/2023 | Vukotic | G01N 23/20033 378/70 |
| 2024/0151662 A1 * | 5/2024 | Belassel | G01N 23/207 |

FOREIGN PATENT DOCUMENTS

| | | | |
|---|---|---|---|
| JP | 2014106004 A | * | 6/2014 |
| NL | 7416557 A | | 6/1976 |

OTHER PUBLICATIONS

Written Opinion from corresponding PCT Application No. PCT/CA2022/050041 dated Mar. 16, 2022.
Extended European Search Report from EP Application No. 22738865.9 dated Nov. 25, 2024.

* cited by examiner

LAUE MEASUREMENT SYSTEM WITH TURNTABLE AND METHOD OF OPERATING THE SAME

CROSS REFERENCE TO RELATED PATENT APPLICATIONS

This application is a national stage application under 35 U.S.C. § 371 of PCT International Application No. PCT/CA2022/050041, which has an international filing date of 12 Jan. 2022 and claims the benefit of U.S. Application No. 63/136,255 filed on 12 Jan. 2021. The contents of each application recited above are incorporated herein by reference in their entirety.

FIELD

The technical field generally relates to a method and system of X-ray diffraction, and more particularly relates to a method and system for measuring crystal orientation of turbine blades by Laue measurements.

BACKGROUND

Laue diffraction is used to measure crystal orientation. One difference between a Laue instrument and a traditional powder diffractometer is that polychromatic radiation (e.g., Bremsstrahlung radiation) is used instead of a monochromatic beam. There are two ways of performing X-ray diffraction using Laue images. In transmission Laue systems, the film or X-ray detector is placed behind the crystal to record X-ray beams which are transmitted through the crystal. In back-reflection Laue systems, also generally referred to herein as "back-reflection Laue systems", the actual film or X-ray detector is placed between the X-ray source and the crystal. Thus, the X-ray beams which are diffracted in a backwards direction are recorded. The X-ray source/crystal/detector arrangement of back-reflection Laue systems also typically provides for a compact size relative to a transmission Laue system.

Laue measurements can be performed on single crystal turbine components (such as turbine blades, or turbine vanes) and casing components used in aero-engines and gas-powered engines to measure orientation of the crystal. In recent years, there has been an increasing demand for low maintenance cost, light weight and reduction of fuel consumption. As a result, engine manufacturers started replacing most of the polycrystalline and directionally solidified turbine components with single crystal turbine components. All these single crystal turbine components and other single crystal components are required to be checked individually. More specifically, the orientation of the single crystal has to be measured as they come out of the mold.

In existing Laue systems, each turbine component is individually placed within an enclosure that can receive X-rays and tested. This leads to increased measurement times and costs. Alternative solutions used to date include the use of robotic arms that can automatically grip the turbine components. However, the geometry of the parts to be tested is relatively complex and can pose a challenge in the design of the robotic arms and grippers. Furthermore, the cost of a robotic arm tends to be too high.

Many challenges still exist in the field of Laue measurements of crystal orientation of turbine components and other crystalline components.

SUMMARY

In one aspect of the present description, an X-ray diffraction apparatus for successively measuring crystal orientation of a plurality of crystalline samples is provided. The apparatus comprises:
an enclosure that is shielded against X-ray radiation;
a sample stage provided within the enclosure, comprising:
a turntable comprising at least one tray for positioning each one of the crystalline samples thereon at a corresponding measuring position, to obtain a set of measuring positions;
a turntable support platform defining a plane, and onto which the turntable is supported; and
a motorized turntable displacement system for remotely displacing the turntable linearly along a first axis parallel to the plane, linearly along a second axis perpendicular to the plane, and rotatably about the second axis;
an X-ray assembly provided within the enclosure, comprising:
an X-ray source to generate X-ray radiation and a collimator connected to the X-ray source to generate a collimated X-ray beam, the collimated X-ray beam being directed toward the turntable;
a detector assembly to detect and capture X-ray radiation diffracted from the crystalline samples positioned on the turntable;
an X-ray assembly support platform onto which the X-ray source, collimator and X-ray detector assembly are supported; and
a motorized X-ray assembly displacement system for displacing the support platform linearly along a third axis, the third axis being parallel to the plane and non-parallel to the first axis;
wherein, for each one of the crystalline samples, at least one of the motorized turntable displacement system and the motorized X-ray assembly displacement system is actuated to align the collimated X-ray beam with the corresponding measuring position and measure the crystal orientation of the crystalline sample.

In some embodiments, the set of measuring positions is unchanged throughout measuring the crystal orientation of all the crystalline samples.

In some embodiments, the sample stage is removably positionable within the enclosure.

In some embodiments, the sample stage is removably slidable into the enclosure via a rail system provided on a surface of the enclosure.

In some embodiments, the enclosure comprises a door that is closed when the X-ray source emits the X-ray radiation.

In some embodiments, the door is closed when at least one of the motorized X-ray assembly displacement system and the motorized turntable displacement system is active.

In some embodiments, the turntable comprises a plurality of stages parallel provided one over the other, along the second axis, each stage being configured to have at least one of the crystalline samples placed thereon.

In some embodiments, the plurality of stages comprises at least three stages.

In some embodiments, the at least one tray of the turntable is removable from the turntable.

In some embodiments, the motorized turntable displacement system comprises a motorized linear slide for displacing the turntable linearly along the first axis.

In some embodiments, the motorized turntable displacement system comprises a motorized linear slide for displacing the turntable linearly along the second axis.

In some embodiments, the motorized turntable displacement system comprises a motorized gear assembly for rotatably displacing the turntable about the second axis.

In some embodiments, the apparatus further comprises a manual turntable displacement system for manually displacing the turntable parallel to the plane, linearly along the second axis perpendicular to the plane, and rotatably about the second axis.

In some embodiments, the first axis and the third axis are substantially perpendicular.

In some embodiments, the set of measuring positions is obtained using a positioning pointer or a positioning laser.

In some embodiments, the apparatus further comprises a marker to mark some of the crystalline samples after measurement, according to a predetermined condition.

In some embodiments, the X-ray radiation is polychromatic X-ray radiation.

In some embodiments, the apparatus is a Laue apparatus.

In some embodiments, the Laue apparatus is configured in a side-reflection configuration.

In some embodiments, the side-reflection configuration is a 60° side-reflection configuration or a 90° side-reflection configuration.

In some embodiments, the crystalline samples are single crystals or multiple domain crystals.

In some embodiments, the crystalline samples are crystalline turbine blades.

In another aspect of the present description, a method for automated measurement of the crystal orientation of a plurality of crystalline samples is provided. The method comprises:

positioning each one of the crystalline samples onto at least one tray of a turntable, at a corresponding measuring position, the turntable being supported by a turntable support platform defining a plane;

recording the corresponding measuring position of each one of the crystalline samples positioned on the turntable, thereby obtaining a set of recorded measuring positions;

generating X-ray radiation from an X-ray source and collimating the X-ray radiation into a collimated X-ray beam;

for each one of the plurality of crystalline samples positioned on the turntable, and after obtaining the set of recorded measuring positions:

displacing the X-ray source, an X-ray detector and/or the turntable to align the collimated X-ray beam with the corresponding recorded measuring position; and measuring the crystal orientation of the crystalline sample at the corresponding recorded measuring position, wherein displacing the X-ray source, an X-ray detector and/or the turntable to align the collimated X-ray beam with the corresponding recorded measuring position comprises at least one of:

remotely displacing the turntable linearly along a first axis parallel to the plane;

remotely displacing the turntable linearly along a second axis perpendicular to the plane;

remotely displacing the turntable rotatably about the second axis; and remotely displacing the X-ray source and the X-ray detector along a third axis that is parallel to the plane and non-parallel to the first axis.

In some embodiments, the set of recorded measuring positions is unchanged throughout measuring the crystal orientation of all the crystalline samples.

In some embodiments, positioning each one of the crystalline samples onto the turntable comprises manually positioning the crystalline samples onto the turntable outside of an enclosure shielded against X-ray radiation and placing the turntable within the enclosure after the crystalline samples are placed thereon.

In some embodiments, the method further comprises closing an enclosure door after placing within the enclosure the turntable having the crystalline samples thereon.

In some embodiments, the enclosure door is kept closed throughout the displacing and measuring steps for each one of the crystalline samples.

In some embodiments, the first axis and the third axis are substantially perpendicular.

In some embodiments, recording the corresponding measuring positions is performed using a positioning pointer or a positioning laser.

In some embodiments, the turntable comprises a plurality of trays mounted on top of one another along the second axis, each tray being configured to have at least one of the crystalline samples positioned thereon.

In some embodiments, the method further comprises marking some of the crystalline samples after measurement, according to a predetermined condition.

In some embodiments, the X-ray radiation is polychromatic X-ray radiation.

In some embodiments, measuring the crystal orientation of the crystalline sample is performed by Laue diffraction.

In some embodiments, the crystalline samples are single crystals or multiple domain crystals.

In some embodiments, the crystalline samples are crystalline turbine blades.

DETAILED DESCRIPTION

Figure 1:
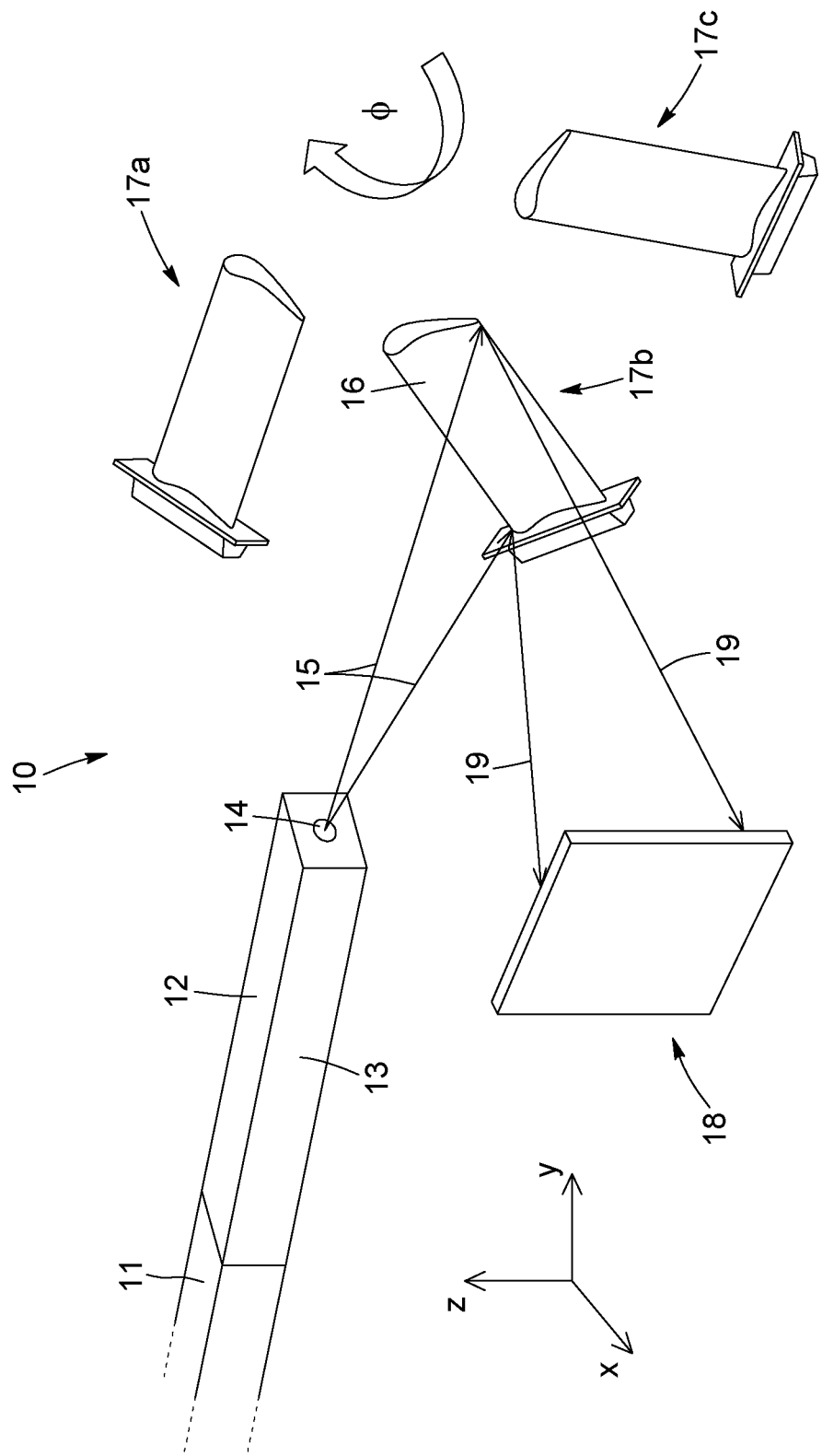
FIG. 1 is a diagram of the layout of some of the components of an apparatus for measuring crystal orientation according to an embodiment.
Figure 2:
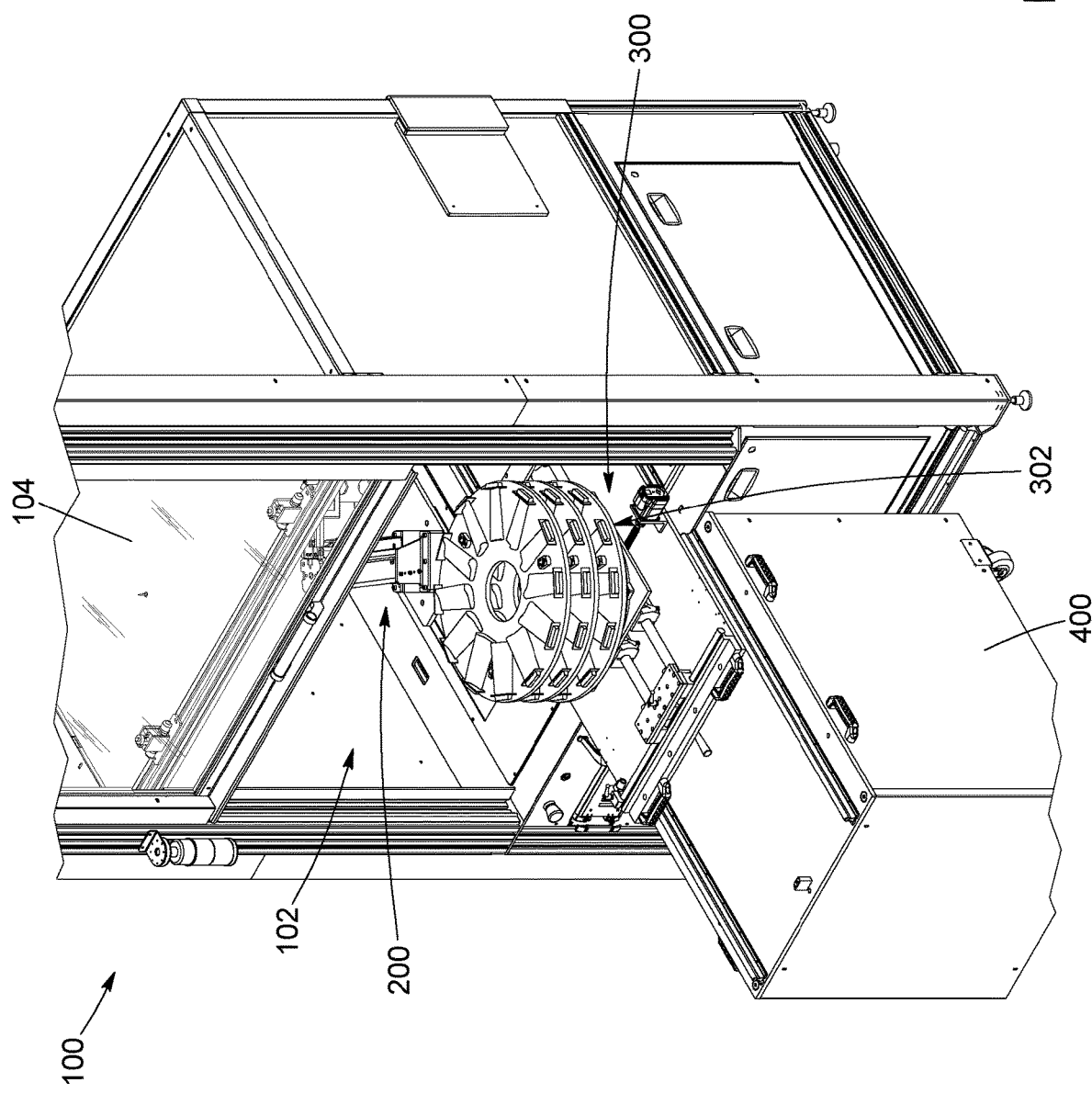
FIG. 2 is a perspective view of an apparatus for measuring crystal orientation, according to an embodiment, during loading of the turntable.
Figure 3:
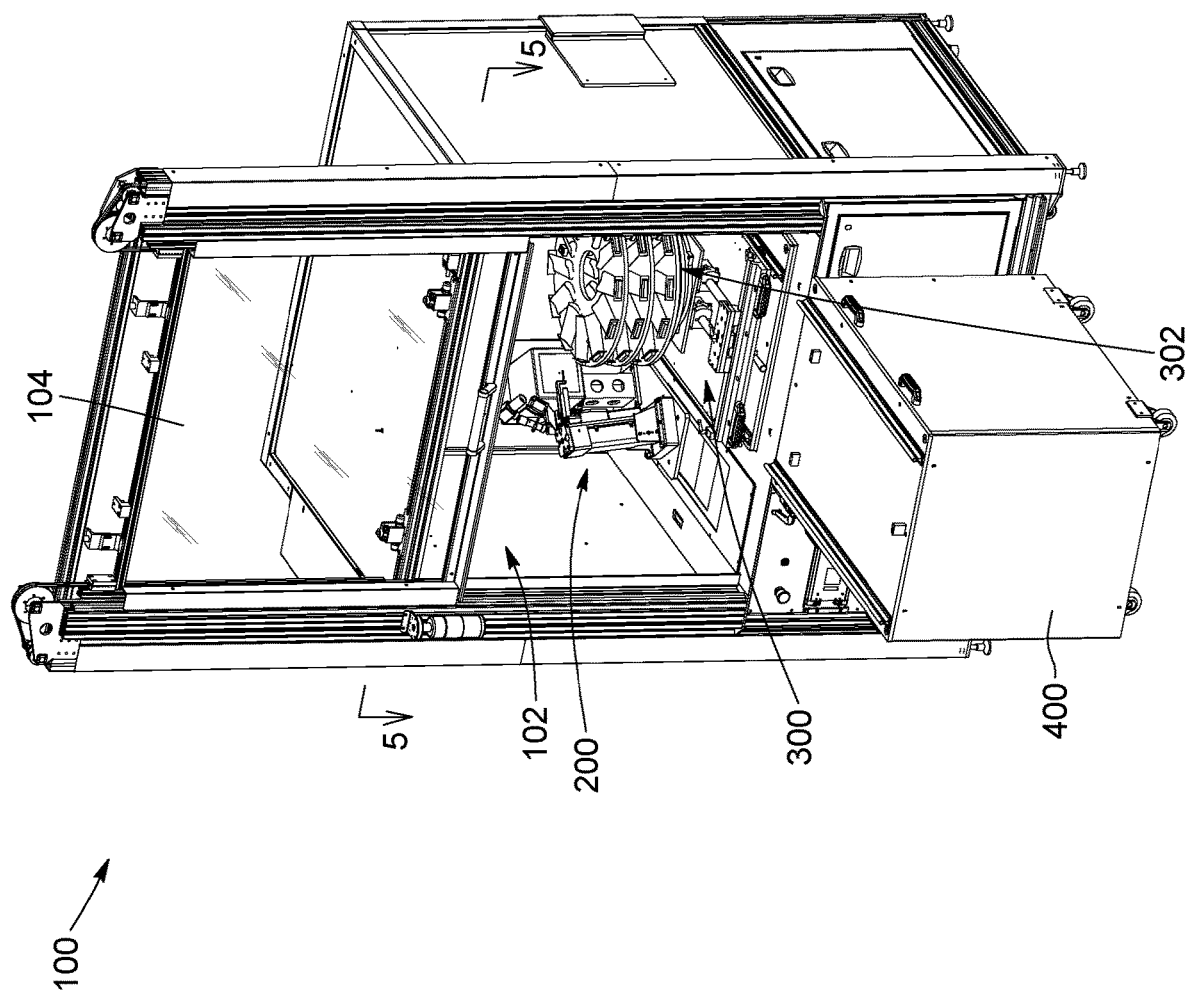
FIG. 3 is another cross-sectional view of the apparatus of FIG. 1, after loading of the turntable.
Figure 4:
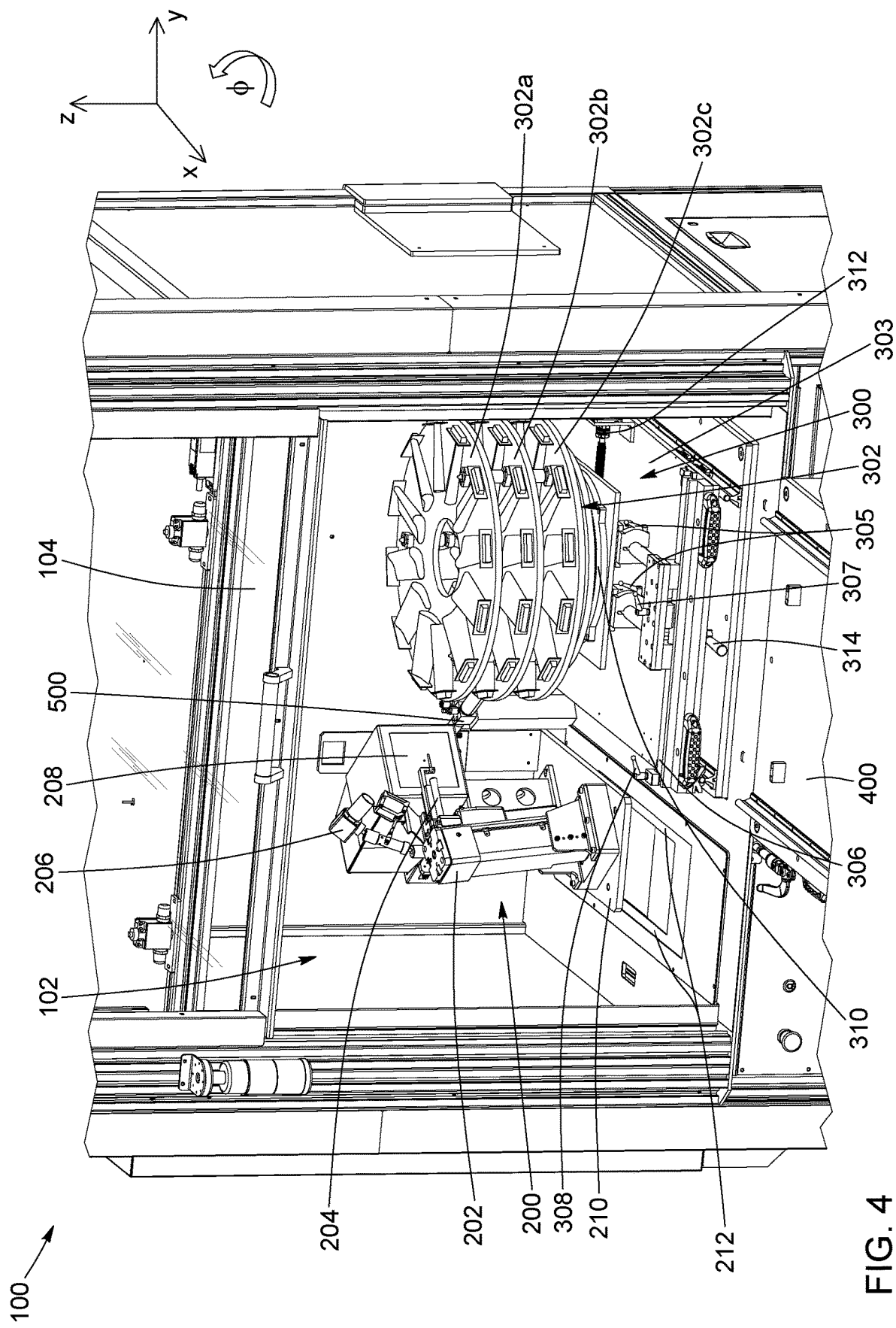
FIG. 4 is a partial cross-sectional view of the apparatus of FIG. 1, after loading of the turntable.
Figure 5:
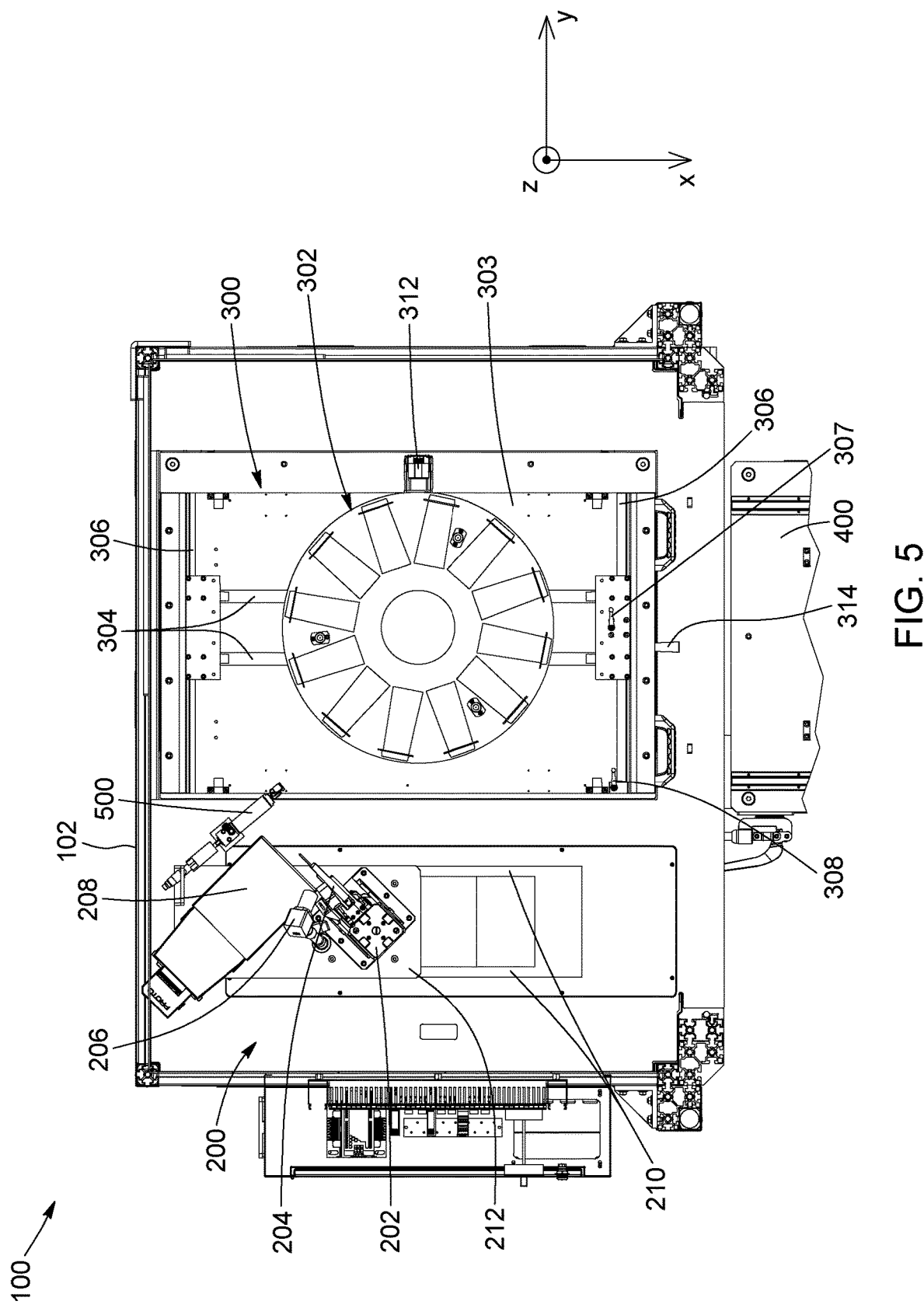
FIG. 5 is a top plan view of the apparatus of FIG. 1.

In the following description, similar features in the drawings have been given similar reference numerals. In order to not unduly encumber the figures, some elements may not be indicated on some figures if they were already mentioned in preceding figures. It should also be understood herein that the elements of the drawings are not necessarily drawn to scale and that the emphasis is instead being placed upon clearly illustrating the elements and structures of the present embodiments.

It will be appreciated that positional descriptions such as "top", "bottom", "above", "under", "below", "left", "right", "front", "rear", "parallel", "perpendicular", "transverse", "inner", "outer", "internal", "external", and the like should, unless otherwise indicated, be taken in the context of the figures and should not be considered limiting.

The terms "X-ray", "X-radiation", "light", "electromagnetic radiation", "optical", "spectral profile" "spectral waveband", derivatives and variants thereof, are used to refer to radiation in any appropriate region of the electromagnetic spectrum and, more particularly, are not limited to visible light. By way of example, the X-rays may cover or substantially correspond to wavelengths ranging from 0.01 to 10 nanometers (i.e., frequencies in the range of 30 petahertz to 30 exahertz), which may be of particular interest for applications in the materials science industry for investigating the structural and/or mechanical properties of samples. Such properties include but are not limited to crystal orientation, atomic structure, phase mapping, dislocation and residual stress. Notably, the properties include crystal orientation of monocrystalline samples such as monocrystalline turbine components.

The terms "sample", "sample under investigation", "material", "analyzed sample", "powder", "thin films", derivatives and variants thereof are used to refer to a quantity of matter extracted or taken apart from a larger amount for analysis, or may refer to matter that is either natural (e.g., a specific chemical element found in nature), synthesized (e.g., a reaction of chemical compounds), or man-made (e.g., a monocrystalline turbine component). It will be understood that the sample intrinsically has various physical and chemical properties, which may be assessed using different instruments and methods (e.g., XRD analysis). In the context of the current disclosure, it is to be noted that the samples to be characterized are typically crystalline samples, such as single crystalline samples (also referred to as monocrystalline samples). Examples of samples include single crystal turbine components—or monocrystalline turbine components. Such turbine components can for example be turbine blades or turbine vanes.

The terms "diffractometer", "X-ray diffraction apparatus", "XRD diffraction system", "powder diffraction instruments", "X-ray apparatus", derivatives and variants thereof refer to an apparatus configured to acquire patterns obtained by recording the intensities of X-rays scattered by the sample under investigation at different angles between an incident beam (i.e., beam incident on the sample) and a scattered beam (also referred to as "reflected beam"). The acquired patterns are typically representative of given properties (e.g., structure or crystalline orientation) of the material to be inspected. The above-mentioned apparatus could further be understood as a device configured to sense and/or probe x-rays scattered and/or reflected by the surface to be inspected, according to the needs of a particular application.

The XRD apparatus may include an X-ray source (including, for example, a vacuum-sealed X-ray tube or incorporate into a high flux source such as a synchrotron, liquid metal jet, or any other, or any neutron source), an X-ray generator delivering high tension current to the X-ray source, a sample holder to hold the sample to be investigated, an X-ray detector capable of detecting X-ray and/or X-ray photons scattered by the sample and an X-ray optical assembly (typically used for collimating, conditioning, or focusing the X-rays at the detector). The XRD pattern is obtained by recording the intensities of X-rays scattered by the sample at different angles between the beam incident on the sample and beam scattered by the sample.

In the following description, a plane such as a "XY plane" is defined as a plane substantially parallel to (or a plane coinciding with) a surface, a portion or a section of the sample to be characterized. In such scenario, a "Z direction" or, alternatively, a "Z axis", and variants thereof (e.g., "Z plane") will hence be understood as the axis being substantially perpendicular to the XY plane (i.e., the surface of the sample). Broadly, the present description will refer to the "XY, XZ and YZ planes" as being three perpendicularly intersecting planes. For the sake of clarity and concision of the present description, the XY plane will herein be referred to as lying in a horizontal plane, while the Z axis will be referred to as a vertical axis substantially perpendicular to the XY plane.

In the present description, the Laue method (or Laue apparatus, or Laue system) for measuring crystal orientation is defined as a method (or an apparatus, or a system) using white (or polychromatic) X-ray radiation that is reflected from or transmitted through a fixed crystal. The diffracted X-ray beams form arrays of spots, that lie on curves on the film. The Bragg angle is fixed for every set of planes in the crystal. Each set of planes picks out and diffracts the particular wavelength from the white radiation that satisfies the Bragg law for the values of d and q involved. Each curve therefore corresponds to a different wavelength. The spots lying on any one curve are reflections from planes belonging to one zone. Laue reflections from planes of the same zone all lie on the surface of an imaginary cone whose axis is the zone axis. Crystal orientation is them determined from the position of the spots and each spot can be indexed to a particular plane, using charts. For example, the Greninger chart can be used for back-reflection patterns and the Leonhardt chart for transmission patterns. The Laue technique can also be used to assess crystal perfection from the size and shape of the spots. If the crystal has been bent or twisted in any way, the spots become distorted and smeared out.

The present description provides a Laue apparatus, and corresponding methods of operation, for measuring crystal orientation of a crystalline sample, such as a crystalline turbine component (e.g., a monocrystalline turbine component). As will be described further herein, the Laue apparatus of the present description includes a turntable onto which multiple crystalline samples can be preloaded, such that automated crystal orientation measurements can be conducted on each one of the samples. An X-ray source provides X-ray radiation, in turn, to each one of the crystalline samples (e.g., by means of a collimator) and an X-ray detector collects the diffracted X-ray radiation. The relative position of the crystalline samples on the turntable, the X-ray source and the X-ray detector can be adapted depending on an initial positioning of each one of the crystalline samples in several dimensions (e.g., x, y, z and φ), such that crystal orientation measurements for each one of the crystalline samples can be performed without having to manually reposition the crystalline samples between measurements.

Now referring to FIG. 1, a diagram of the layout of some of the components of an apparatus 10 for measuring crystal orientation of a crystalline sample according to an embodiment of the present description is shown. The apparatus 10 includes an X-ray generator 11 which can produce radiation suitable for use in the Laue method (e.g., polychromatic radiation). The X-ray generator 11 can alternatively generate monochromatic radiation. The X-ray generator 11 can include an X-ray tube that produces X-rays (e.g., with wavelengths between about 0.04 and about 0.25 nm). These X-rays can pass through a collimator 12 which can include an opaque member 13 and exit through at least one hole 14 located at an end of the collimator 12. The X-rays emerge from the collimator 12 as emerging X-ray beams 15. The emerging X-ray beams 15 are directed onto a surface 16 of a crystalline sample 17b which is positioned on a surface of a turntable (surface not shown in FIG. 1) and diffracted beams 19 are then diffracted onto an X-ray detector 18. Other crystalline samples (17a, 17c) can also be positioned on the surface of the turntable and can be suitably positioned to receive X-ray beams 15 by varying at least one of dimensions x, y, z and 1 by displacing the turntable (or various components of the turntable), the X-ray generator 11 and/or the X-ray detector 18.

In the embodiment shown, the crystalline sample is a turbine blade 17a, 17b, 17c of a turbine engine, that is preferably cast as a single crystal that makes up the complete turbine blade. It is typically preferable that the crystal has the same orientation throughout the longitudinal extent of the blade and at all points on the surface of the blade. The apparatus of the present description can be used to analyze the surface of several blades in sequence, and can for example detect surface defects, surface breaking secondary grains and/or differences in crystal orientation.

If the orientation of a single crystal and the shape of a crystalline sample are known, an accurately predictable pattern of spots can be produced by the apparatus of the present description and can be observed via the X-ray detector 18. Each spot on the pattern corresponds to where one of the diffracted beams 19 contact the X-ray detector 18. A disarrangement of the pattern of spots typically indicates a difference in crystal orientation, surface breaking secondary grains and/or crystal defects. Different disarrangements of the pattern of spots can indicate different types of crystal orientation.

Now referring to FIGS. 2 to 5, an X-ray diffraction apparatus 100 for measuring crystal orientation of crystalline samples according to an embodiment of the present description is shown. The X-ray diffraction apparatus 100 includes an enclosure 102 provided with an enclosure door 104, and into which are provided:
  an X-ray diffraction assembly 200 for generating X-ray radiation, directing the X-ray radiation toward a crystalline sample and collecting/detecting diffracted X-ray radiation; and
  a removable sample stage 300 that includes a turntable 302, that is configured to position a plurality of crystalline samples (such as single crystal turbine blades) placed thereon, such that crystal orientation of each one of the crystalline samples can be measured in succession, without having to open the enclosure door 104 and without having to manually reposition the crystalline samples between the first and last measurement.

Still referring to FIGS. 2 to 5, the X-ray diffraction assembly 200 (also referred to as an X-ray generating and collecting assembly) includes an X-ray source 202 and a collimator 204 to direct the generated X-ray radiation toward the sample stage 300. The X-ray diffraction assembly 200 further includes an detector assembly that can include a camera 206 and an X-ray detector 208. In the embodiment shown, all the components of the X-ray diffraction assembly 200 are provided on a supporting surface (or a support platform) 210 that is slidable along translation slide 212. In the embodiment shown, translation slide 212 allows displacing the supporting surface and the supported X-ray diffraction assembly along axis X. The components provided on the supporting surface, notably the X-ray source 202, the collimator 204, and the detector assembly are rotatable about axis Z while being attached to the supporting surface 210. Displacement of the X-ray diffraction assembly 200 along translation slide 212 can be motorized and controlled remotely and/or automated, as the enclosure door 104 is closed.

Figure 7:
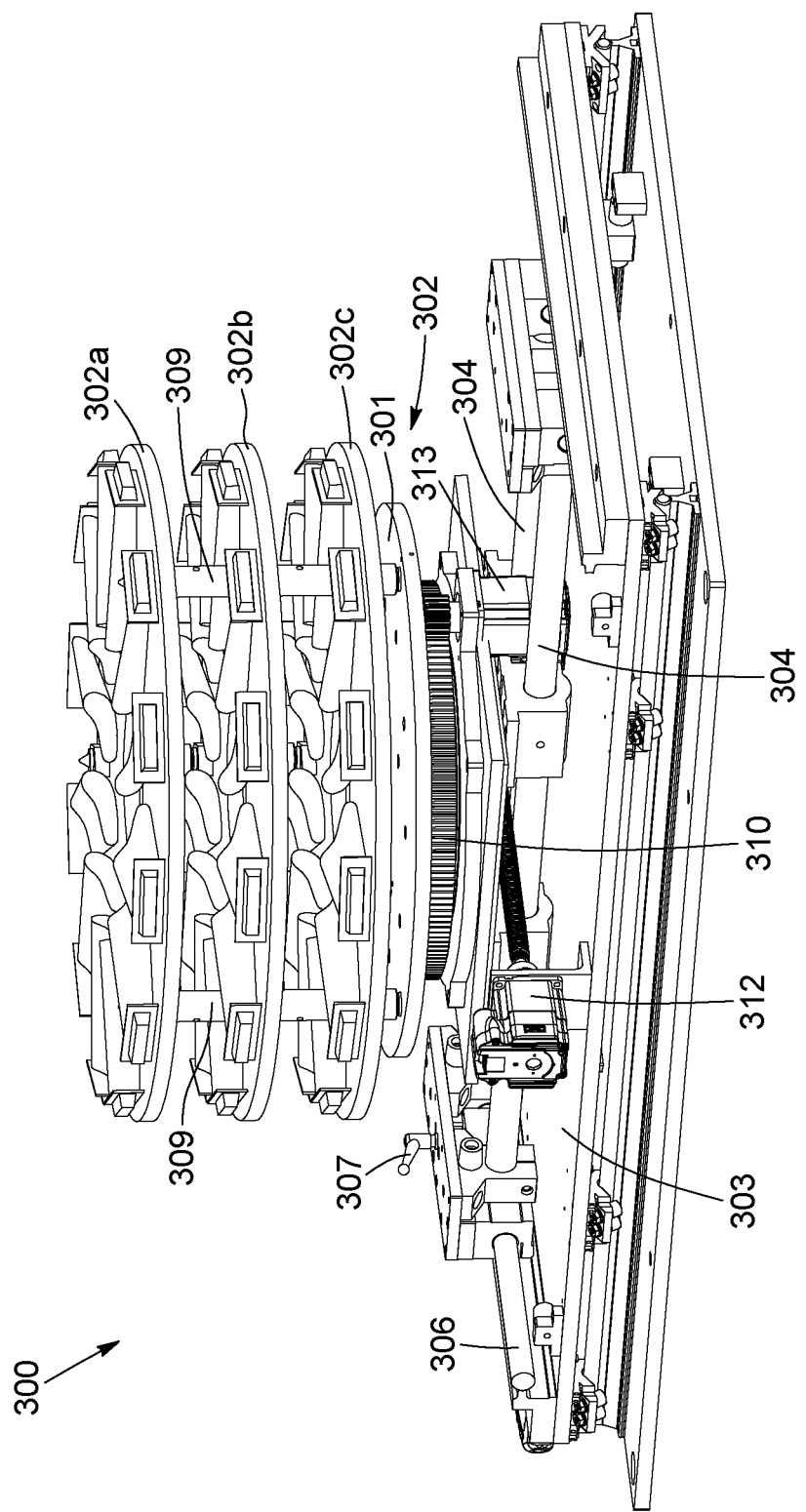
FIG. 7 is a perspective view of the sample stage, according to an embodiment.
Figure 8:
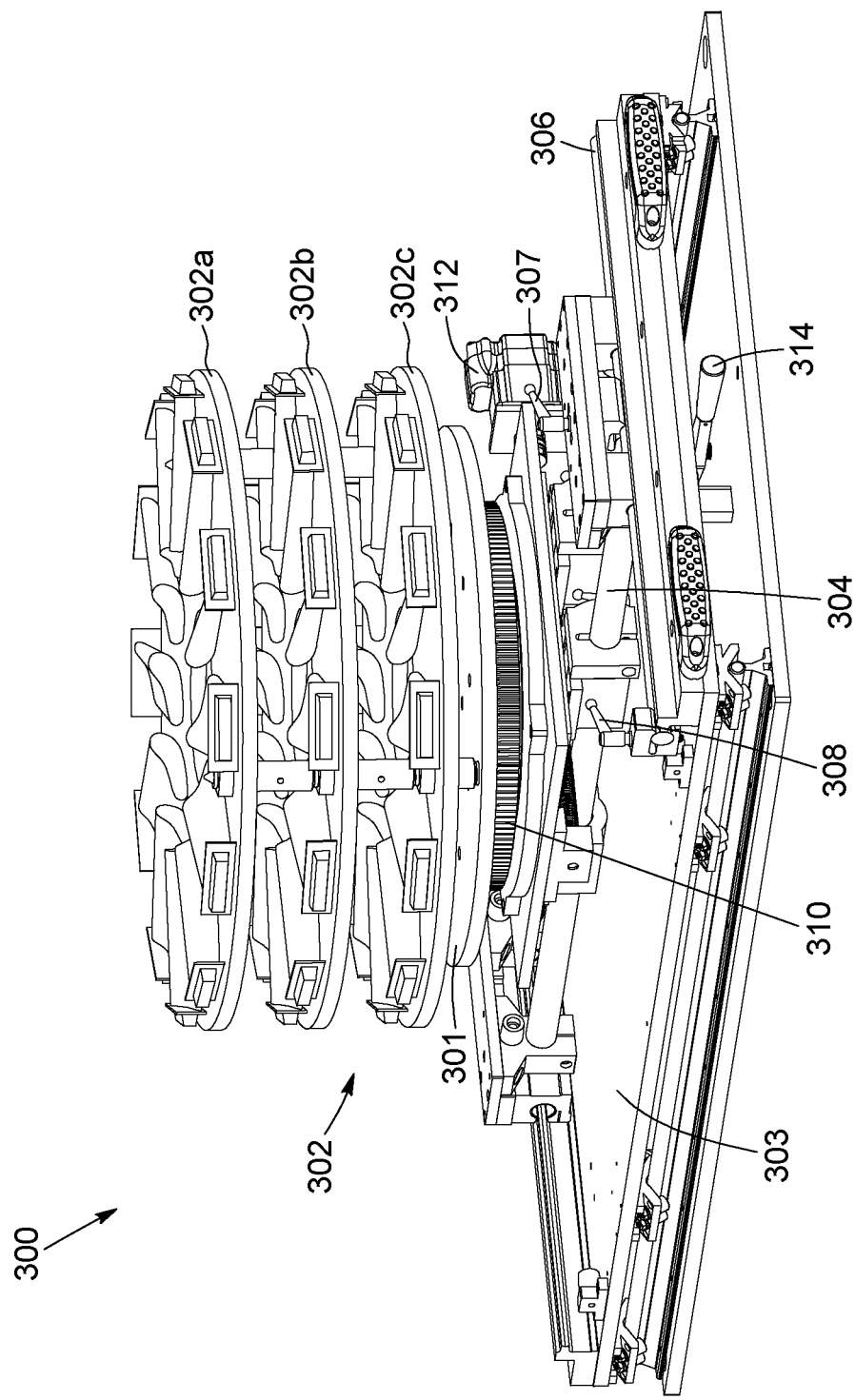
FIG. 8 is another perspective view of the sample stage of FIG. 8.

Still referring to FIGS. 2 to 5 and to FIGS. 7 to 8, the removable sample stage 300 includes a turntable 302. The turntable 302 can include a single tray (or layer, or palette) or can include multiple trays (or layers, or palettes). In the embodiment shown in FIGS. 2 to 5, 7 and 8, the turntable 302 includes three trays 302a, 302b, 302c mounted one over the other along the Z axis. A base platform 301 supports the three trays 302a, 302b, 302c, for example via supporting poles 309. A motor 313, a gear assembly 310 and the base platform 301 are operatively connected such that operating the motor 313 rotates the turntable 302 (i.e., rotation of the base platform 301 as well as the trays 302a, 302b, 302c). The turntable 302 is provided onto turntable support surface (or turntable support platform) 303. In the embodiment shown, the XY plane is parallel to the surface of the turntable support surface and parallel to the surface of the three trays 302a, 302b, 302c.

The turntable 302 can be displaced along all three axes X, Y and Z. In the embodiment shown, the turntable 302 is displaceable along axis X via first turntable translation slide 304. Movement of the turntable 302 along axis X can be allowed or restricted/prevented by releasing or actuating latches 305. Similarly, the turntable 302 is displaceable along axis Y via second turntable translation slide 306. Movement of the turntable 302 along axis Y can be allowed or restricted/prevented by releasing or actuating latch 307. A lock 308 can be provided at one end of the translation slide 306 to serve as a reference point. The turntable 302 is also displaceable along axis Z. Displacing the turntable 302 along axis Z can be performed by elevating or lowering the turntable support surface 303 along axis Z, or by elevating or lowering the trays 302a, 302b, 302c along axis Z. For example, displacing the turntable 302 along axis Z can be performed by operating a vertical translation slide that can be located under the surface 303 (not visible in the Figures). The turntable 302 can also be rotated about axis Z (or along angle $\phi$). In the embodiment shown, the rotation of the turntable 302 about axis Z is performed via gear assembly 310 and motor 313.

Displacement of the turntable 302 along all three axes X, Y and Z as well as rotation of the turntable about axis Z can be performed manually when the enclosure door 104 is open. When the enclosure door 104 is closed, displacement of the turntable 302 along axes Y and Z as well as rotation of the turntable 302 about axis Z can be motorized and controlled remotely and/or automated. In the embodiment shown, a motor 312 operatively connected to slide 306 is provided for remotely displacing the turntable 302 along axis Y (in other words, slide 306 is a motorized slide). As discussed above, motor 313 is operatively connected to gear assembly 310 and enables rotation of the turntable about axis Z. Similarly, displacing the turntable 302 along axis Z can be performed by providing a corresponding motor operatively connected to a vertical translation slide that can be located under the surface 303 (not visible in the Figures).

While a motor can be provided to remotely displace the turntable along axis X, automatic positioning along axis X is, in the embodiment shown in the Figures, performed by remotely displacing the X-ray diffraction assembly 200 along axis X, rather than by remotely displacing the turntable 302 along axis X.

Each tray 302a, 302b, 302c of the turntable 302 can accommodate a plurality of samples to be tested, such as a plurality of turbine blades. The samples can be held in place on their respective tray by simply positioning the samples on the surface of the turntable or can alternatively be held in place using sample holders that can be prepositioned onto and/or affixed to the surface of the turntable.

The measurement positions can be preprogrammed (such as in a dedicated Laue software), for example in all four directions X, Y, Z and $\phi$, to correspond to the number of blades on each tray and to the number of trays.

It is understood that the turntable 302 can be positioned within the apparatus 100 in various ways, to allow for the crystal orientation measurements to be performed. Now turning to FIGS. 2 and 3, in some embodiments, the turntable 302 is provided on the removable sample stage 300, and the sample stage 300 can be placed onto a loading cart 400. For example, the loading cart can be provided with rails onto which the removable sample stage 300 can be positioned. The enclosure door 104 is opened so that a user can access the enclosure 102, and the loading cart 400 is positioned in front of the enclosure 102. Once the samples are positioned onto the various trays of the turntable and their location/positioning recorded, the removable sample stage 300 can be slid into the enclosure. A positioning system such as a positioning pointer or laser can then be used to obtain the X, Y, Z and $\phi$coordinates of each sample and measurement location. The enclosure door 104 can then be closed and the system can be programmed for measuring crystal orientation of all the samples (for example in continuous mode). A locking mechanism 314 can be provided on the removable sample stage 300 to hold the removable sample stage 300 in place within the enclosure 102.

Figure 6A:
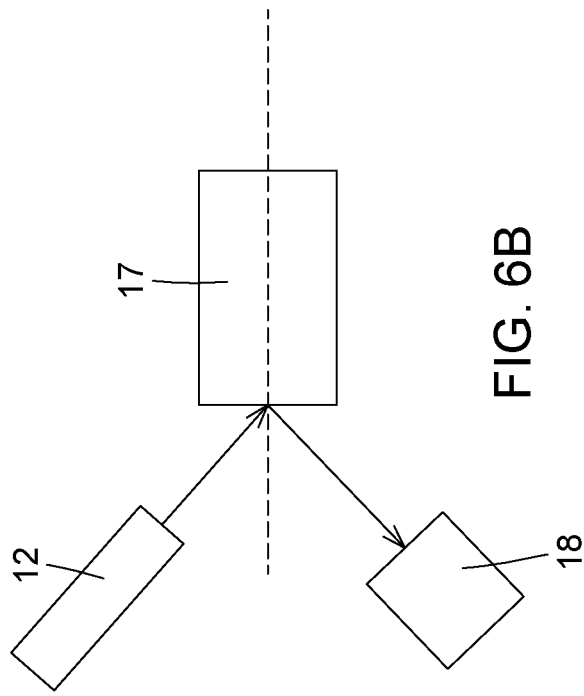
FIG. 6A is a diagram of a 60° side-reflection configuration for the apparatus of FIG. 1.
Figure 6B:
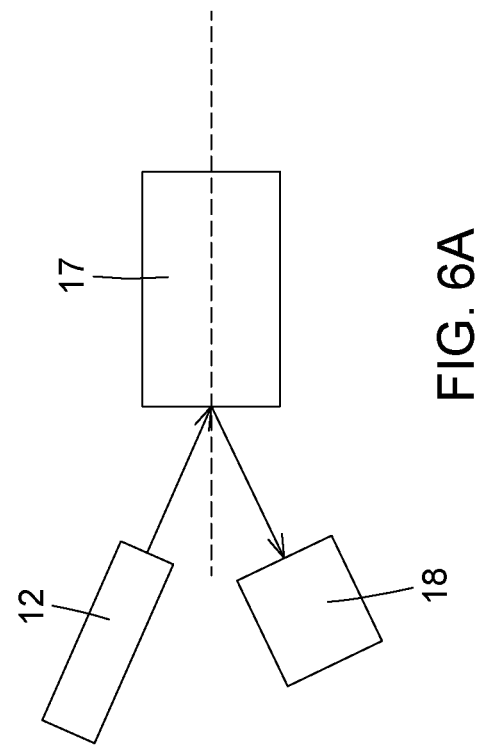
FIG. 6B is a diagram of a 90° side-reflection configuration for the apparatus of FIG. 1.
Figure 6C:
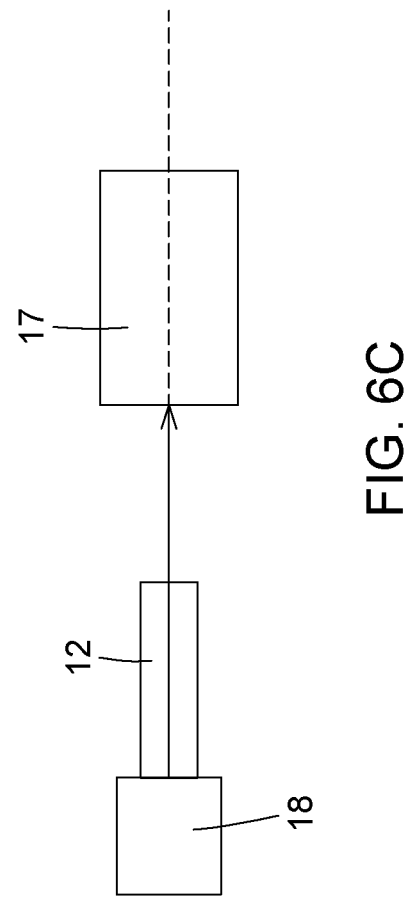
FIG. 6C is a diagram of a back-reflection configuration for the apparatus of FIG. 1.

Now referring to FIGS. 6A to 6C, it is understood that the crystal orientation measurement system can be configured in several measurement geometries. For example, and as shown at FIG. 6A, the X-ray source 12, detector 18 and sample 17 can be positioned in a 60° side-reflection configuration—this configuration typically provides a balance between sensitivity and accessibility. For example, and as shown at FIG. 6B, the X-ray source 12, detector 18 and sample 17 can be positioned in a 90° side-reflection configuration—this configuration typically provides improved sensitivity with some reduction in accessibility. In yet another example, and as shown at FIG. 6C, the X-ray source 12, detector 18 and sample 17 can be positioned in a back-reflection configuration—this configuration typically provides reduced sensitivity with a high accessibility for large samples. Of course, other configurations are possible, where the X-ray source 12, detector 18 and sample 17 can be positioned at various angles.

In some embodiments, the system can further include a marker 500 to mark some of the crystalline samples after measurements. For example, the marker 500 can be an ink marker or any other type of labeling item that can be used to mark components. Typically, the marker 500 is used to mark crystalline samples that do not meet certain characteristics or a particular threshold for some of its properties. Alternatively, the marker 500 can be used to mark crystalline samples that meet certain characteristics or a particular threshold for some of its properties. This marking can be used to easily or conveniently separate components that meet a certain predetermined standard, threshold or specification from components that do not. In the embodiment shown, the marker 500 is provided directly between the X-ray diffraction assembly 200 and the removable sample stage 300. It should however be understood that the marker 500 can be provided at any location within the enclosure 102 that allows the marker 500 to reach and mark a sample when required. For example, the marker 500 can alternatively be provided on the X-ray diffraction assembly 200, or on the removable sample stage 300.

In some embodiments, the components can be placed on the trays (e.g., round plates). The trays can optionally be molded with the shape of the components, for example via machine casting, 3D printing, etc. The components can then be positioned directly in the mold or hole that is thereby formed. However, it is understood that the components may not all have the exact same dimension. For example, the edge of the components may not always have the same length. In some scenarios, if the variation is larger than a predetermined parameter, the positioning can be adjusted prior to performing the measurement. For example, in the case of turbine blades, if the length of any one blade varies by more than 1 mm compared to a mean value, the measurement can be affected. Therefore, in such case, the positioning of the turbine blade is adjusted prior to measuring. The measuring can be performed on the edge of the blade. A laser positioning system can be directly integrated to the system or can be used externally, prior to inserting the samples within the diffraction chamber. In some scenarios, a feedback loop can be used to adjust the positioning of the components before any measurement.

Figure 9:
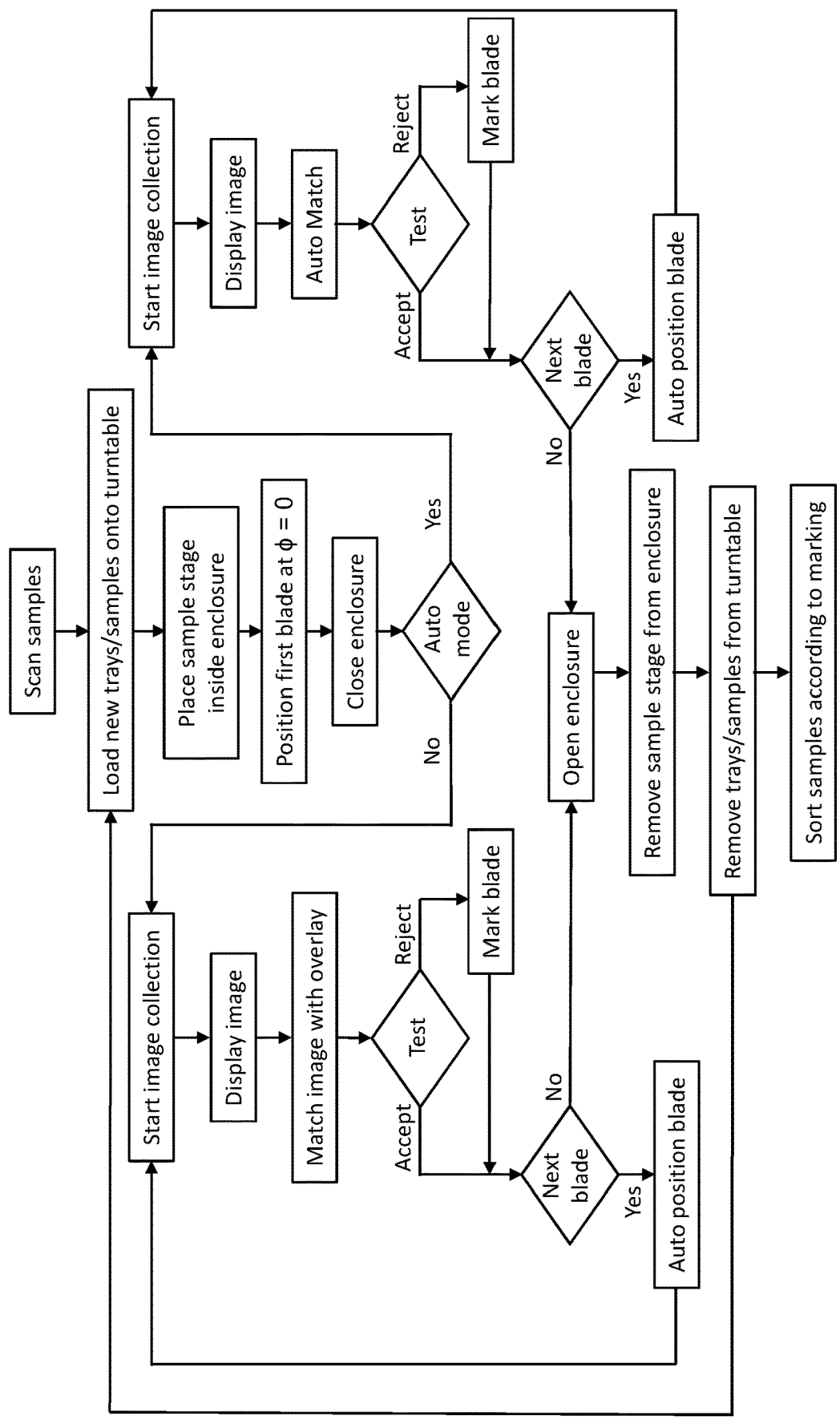
FIG. 9 is a process flow diagram of a method for measuring crystal orientation of a plurality of crystalline samples, according to an embodiment.

In some embodiments, and as shown in FIG. 9, the method for measuring the crystal orientation of a plurality of crystalline samples can include:

Identifying or scanning each one of the crystalline samples. Identifying each one of the crystalline samples can for example be performed by providing barcodes or serial numbers on each one of the crystalline samples.

The method can further include loading the crystalline samples onto a tray or a plurality of trays of the turntable and logging the blade identification number against their position on the turntable. Optionally, the tray can be a custom tray specifically made for the crystalline samples to be tested. For example, the tray can be 3D printed, machined, stamped or molded.

The method can further include mounting the turntable onto a transfer cart located outside the enclosure of an X-ray apparatus. The transfer cart/turntable combination is referred to as a removable sample stage. The removable sample stage can be placed inside the enclosure. The turntable is coupled to the various motors that can enable displacement of the turntable along the Y, Z axes and $\phi$angle. The turntable can be manually moved along the X axis, and the X-ray diffraction assembly is coupled to a motor that can enable displacement of the X-ray diffraction assembly along the X axis.

The first crystalline sample to be measured can be positioned using a manual pointer, via the slides and $\phi$rotation, as required. The position of the other crystalline samples relative to the first crystalline sample is known from the log (also referred to herein as the set of measuring positions) obtained after loading the crystalline samples onto the tray or plurality of trays.

The method can further include closing the enclosure door;

The automated measurements can then be started by:

generating X-ray radiation from an X-ray source and collimating the X-ray radiation into a collimated X-ray beam;

for each one of the plurality of crystalline samples positioned on the turntable, and after obtaining the set of recorded measuring positions:

displacing the X-ray source, an X-ray detector and/or the turntable to align the collimated X-ray beam with the corresponding recorded measuring position; and measuring the crystal orientation of the crystalline sample at the corresponding recorded measuring position.

After each individual measurement or after all the measurements are done, an image can be displayed for each crystalline sample for verification. Based on a predetermined set of criteria, each one of the measurements can be accepted or rejected. The accepted and rejected crystalline samples can be identified. For example, in some scenarios, the rejected crystalline samples can be marked with a marker (e.g., an industrial marking device).

When the identification of accepted and rejected crystalline samples is performed after each measurement, the turntable can be automatically positioned to the next crystalline sample after the previous sample has been accepted or rejected.

When all the crystalline samples are measured, the enclosure door can be opened, and the removable sample stage can be removed from the enclosure.

In some embodiments, an operator can sort the crystalline samples remotely. For example, the rejected blades can be marked with ink. Overlay matching can be performed manually, automatically, or both manually and automatically. After the samples or trays are removed from the turntable, new samples or trays onto which samples are placed can be loaded on the turntable and a new round of measurements can be performed.

Several alternative embodiments and examples have been described and illustrated herein. The embodiments described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. The present examples and embodiments, therefore, are to be considered in all respects as illustrative and not restrictive. Accordingly, while specific embodiments have been illustrated and described, numerous modifications come to mind without significantly departing from the scope defined in the appended claims.

The invention claimed is:

1. An X-ray diffraction apparatus for successively measuring crystal orientation of a plurality of crystalline samples, the apparatus comprising:

an enclosure that is shielded against X-ray radiation;

a sample stage provided within the enclosure, comprising:

a turntable comprising at least one tray for positioning each one of the crystalline samples thereon at a corresponding measuring position, to obtain a set of measuring positions;

a turntable support platform defining a plane, and onto which the turntable is supported; and a motorized turntable displacement system for remotely displacing the turntable linearly along a first axis parallel to the plane, linearly along a second axis perpendicular to the plane, and rotatably about the second axis;

an X-ray assembly provided within the enclosure, comprising:

an X-ray source to generate X-ray radiation and a collimator connected to the X-ray source to generate a collimated X-ray beam, the collimated X-ray beam being directed toward the turntable;

a detector assembly to detect and capture X-ray radiation diffracted from the crystalline samples positioned on the turntable;

an X-ray assembly support platform onto which the X-ray source, collimator and X-ray detector assembly are supported; and a motorized X-ray assembly displacement system for displacing the support platform linearly along a third axis, the third axis being parallel to the plane and non-parallel to the first axis;

wherein, for each one of the crystalline samples, at least one of the motorized turntable displacement system and the motorized X-ray assembly displacement system is actuated to align the collimated X-ray beam with the corresponding measuring position and measure the crystal orientation of the crystalline sample.

2. The apparatus of claim 1, wherein the set of measuring positions is unchanged throughout measuring the crystal orientation of all the crystalline samples.

3. The apparatus of claim 1, wherein the sample stage is removably positionable within the enclosure.

4. The apparatus of claim 3, wherein the sample stage is removably slidable into the enclosure via a rail system provided on a surface of the enclosure.

5. The apparatus of claim 1, wherein the enclosure comprises a door that is closed when the X-ray source emits the X-ray radiation.

6. The apparatus of claim 5, wherein the door is closed when at least one of the motorized X-ray assembly displacement system and the motorized turntable displacement system is active.

7. The apparatus of claim 1, wherein the turntable comprises a plurality of stages parallel provided one over the other, along the second axis, each stage being configured to have at least one of the crystalline samples placed thereon.

8. The apparatus of claim 1, wherein the at least one tray of the turntable is removable from the turntable.

9. The apparatus of claim 1, wherein the motorized turntable displacement system comprises a motorized linear slide for displacing the turntable linearly along the first axis.

10. The apparatus of claim 1, wherein the motorized turntable displacement system comprises a motorized linear slide for displacing the turntable linearly along the second axis.

11. The apparatus of claim 1, wherein the motorized turntable displacement system comprises a motorized gear assembly for rotatably displacing the turntable about the second axis.

12. The apparatus of claim 1, further comprising a manual turntable displacement system for manually displacing the turntable parallel to the plane, linearly along the second axis perpendicular to the plane, and rotatably about the second axis.

13. The apparatus of claim 1, wherein the first axis and the third axis are substantially perpendicular.

14. The apparatus of claim 1, wherein the set of measuring positions is obtained using a positioning pointer or a positioning laser.

15. The apparatus of claim 1, further comprising a marker to mark some of the crystalline samples after measurement, according to a predetermined condition.

16. The apparatus of claim 1, wherein the X-ray radiation is polychromatic X-ray radiation.

17. The apparatus of claim 16, wherein the apparatus is a Laue apparatus configured in a side-reflection configuration or in a back-reflection configuration.

18. The apparatus of claim 1, wherein the crystalline samples are single crystals or multiple domain crystals.

19. The apparatus of claim 1, wherein the crystalline samples are crystalline turbine blades.

20. A method for automated measurement of the crystal orientation of a plurality of crystalline samples, the method comprising:
   positioning each one of the crystalline samples onto at least one tray of a turntable, at a corresponding measuring position, the turntable being supported by a turntable support platform defining a plane;
   recording the corresponding measuring position of each one of the crystalline samples positioned on the turntable, thereby obtaining a set of recorded measuring positions;
   generating X-ray radiation from an X-ray source and collimating the X-ray radiation into a collimated X-ray beam;
   for each one of the plurality of crystalline samples positioned on the turntable, and after obtaining the set of recorded measuring positions:
      displacing the X-ray source, an X-ray detector and/or the turntable to align the collimated X-ray beam with the corresponding recorded measuring position; and
      measuring the crystal orientation of the crystalline sample at the corresponding recorded measuring position,
   wherein displacing the X-ray source, an X-ray detector and/or the turntable to align the collimated X-ray beam with the corresponding recorded measuring position comprises at least one of:
      remotely displacing the turntable linearly along a first axis parallel to the plane;
      remotely displacing the turntable linearly along a second axis perpendicular to the plane;
      remotely displacing the turntable rotatably about the second axis; and
      remotely displacing the X-ray source and the X-ray detector along a third axis that is parallel to the plane and non-parallel to the first axis.

* * * * *